(12) United States Patent
Handley

(10) Patent No.: US 6,904,179 B2
(45) Date of Patent: Jun. 7, 2005

(54) METHOD FOR MINIMAL-LOGIC NON-LINEAR FILTER IMPLEMENTATION

(75) Inventor: John C. Handley, Fairport, NY (US)

(73) Assignee: Xerox Corporation, Stamford, CT (US)

(*) Notice: Subject to any disclaimer, the term of this patent is extended or adjusted under 35 U.S.C. 154(b) by 559 days.

(21) Appl. No.: 10/158,499

(22) Filed: May 30, 2002

(65) Prior Publication Data

US 2002/0146179 A1 Oct. 10, 2002

Related U.S. Application Data

(63) Continuation-in-part of application No. 09/561,609, filed on Apr. 27, 2000, now Pat. No. 6,816,621.

(51) Int. Cl.$^7$ ................................................. G06K 9/40
(52) U.S. Cl. ..................... 382/260; 359/885; 455/213; 708/300
(58) Field of Search ................................ 382/210, 211, 382/260, 261, 262, 263, 264, 265; 333/165, 166; 359/308, 339; 455/339; 708/819

(56) References Cited

U.S. PATENT DOCUMENTS

| | | | | |
|---|---|---|---|---|
| 4,589,084 A | * | 5/1986 | Fling et al. ................. 708/551 |
| 4,661,948 A | * | 4/1987 | Shapiro et al. ............. 370/295 |
| 4,771,396 A | * | 9/1988 | South et al. ................. 708/319 |
| 4,941,191 A | * | 7/1990 | Miller et al. ................ 382/261 |
| 6,071,004 A | * | 6/2000 | Le Gall et al. ............. 382/261 |
| 6,173,388 B1 | * | 1/2001 | Abercrombie et al. ........ 712/22 |

* cited by examiner

Primary Examiner—Kanjibhai Patel
Assistant Examiner—Abolfazl Tabatabai
(74) Attorney, Agent, or Firm—Xerox Corporation

(57) ABSTRACT

A method for implementing a filter on a signal is disclosed wherein interval membership information is computed and stored in such a manner so as to use a minimal amount of memory thereby allowing filter computation by a small number of deterministic sequence of table lookups and bit-wise logical operations. In general, the present invention involves using a non-linear filter represented as a plurality of intervals and the discrete values a sample may take. Each sample corresponds to a component in a vector. Each interval is comprised of a lower and upper vector. Each sample value is compared to the lower and upper values of the sample's associated coordinate. A table for that sample is then constructed with binary entries where a '1' denotes that a sample value is within the lower and upper values of the coordinate and '0' denoting otherwise. A table is built for each sample.

1 Claim, 5 Drawing Sheets

{ I0: [X:0,63][Y:0,191]
I1: [X:0,191][Y:192,255]
I2: [X:192,255][Y:64,255]
I3: [X:64,255][Y:0,63]
I4: [X:64,191][Y:64,191] }

METHOD FOR MINIMAL-LOGIC NON-LINEAR FILTER IMPLEMENTATION

This application is a continuation-in-part of U.S. application Ser. No. 09/561,609, filed Apr. 27, 2000, now U.S. Pat. No. 6,816,621 dated Nov. 9, 2004 the disclosure of which is totally incorporated by reference.

FIELD OF THE INVENTION

The present invention is generally related to the field of signal processing and, more particularly, to the field of programmable hardware and/or software filtering systems and methods of image data in compact, efficient computing architectures.

BACKGROUND OF THE INVENTION

In the arts it is often necessary to manipulate a received signal or image, for both practical and operational reasons. For instance, the signal may need to be compressed into a plurality of smaller subsets prior to some secondary operation being performed on the data such as transmission over a cable or phone wire. On the receiving end, compressed transmitted signals may eventually need to be restored or reconstructed to return the signal upon receipt to its original form. Other operations can take the form of feature detection or pattern recognition, among others. In order to manipulate the received signal or image data in these instances, mathematical operations are often performed. To achieve this, the discrete signal or image is often converted into or represented by a mathematical sequence or array of discrete values. For example, binary signals or images often take the form of discrete values of [0,1] and 8-bit gray-scale images often take the form of values in the range of [0.255]. The field of discrete signal and image processing, both theoretical and applied, is relatively dominated by mathematics in the form of specific methods and applications.

Many methods of signal or image processing use one or more applications involving filters. A filter operates by capturing a windowed observation of an image or signal. A windowed observation is a collection or vector of samples from the captured image or signal. Based on this vector, a decision, based on some formula or algorithm, is made about the image or signal at a particular position within the image or signal. In general, a filter operates on a set of signal or image samples which are mathematically written as a vector having the form of $(X_1, \ldots, X_N)$.

Many techniques can be found in the arts, of which the following are representative and which are hereby incorporated by reference being made thereto. For example, a filter could be employed to assign one or more specific codewords to a given sample as shown in FIG. 1, (often called vector quantization), as taught by *Vector Quantization and Signal Compression,* A. Gesho and R. M. Gray, 1991. A filter can also assign one or more tags to a center pixel in order to indicate that the vector represented pixels are part of a specific feature of the captured image, such as a centerline, letter, or symbol. It can also assign a new sample value to the center pixel in order to accomplish the overall goal of a restoration or enhancement of a degraded image, as taught by *Enhancement and Restoration of Digital Documents,* R. P. Loce and E. R. Dougherty, SPIE Press, 1997, and *Enhancement of Digital Documents,* R. P. Loce and E. R. Dougherty, Electronic Imaging Technology, SPIE Press 1999, and *Two-Dimensional Signal and Image Processing* J. S. Lim, Prentice Hall, 1990. A filter can also be used to predict a sample or pixel value outside the capture window with the aim of reducing the amount of data needed to store the image. This technique is often referred to as predictive encoding as taught by *Digital Image Compression Techniques,* M. Rabbani and P. W. Jones, SPIE Press, 1991. A filter can be used to assign an array of fewer, more restrictive values to this observation (often referred to as either "quantization," "thresholding," or "dithering" as taught by *Digital Halftoning for Printing and Display of Electronic Images,* R. P. Loce, P. G. Roetling, and Y. W. Lin, Electronic Imaging Technology, SPIE Press, 1999. Many others are found in the known literature. Other applications of filters used in signal or image processing include, resolution conversion, object detection, speckle-removal, and edge enhancement.

Nonlinear image or signal processing is a general representation of signal or image filtering based on a logical decomposition of a filter into a set of relatively simple operators. Any windowed shift-invariant filter can be represented as a combination of simple operations called hit-or-miss transforms as taught by *Nonlinear Filters for Image Processing,* E. R. Dougherty and J. Astola (eds.), SPIE/IEEE Press, 1999. The term nonlinear refers to the entire class of windowed filters that includes linear filters, i.e., those filters computed by convolution.

Since filters can be highly complex and repeatedly be executed millions of times in rapid succession in order to perform a single operation on a given image or signal, what is needed in the arts are compact, efficient computing architectures directed towards this end. Efficient architectures depend on filter representations. If a filter can be broken down into its base operations, it might be possible to execute the relatively simple operations in parallel in order to achieve high-speed execution and overall efficiency.

*Computational Gray-Scale Morphology on Lattices (A Comparator-Based Image Algebra) Part I: Architecture,* E. R. Dougherty and D. Sinha, Real Time Imaging, Vol. 1, No. 1, 1995, teaches a computer architecture using representations that perform tests in parallel. The representational methods as taught therein express any filtering operation as a collection of logical tests or operations wherein each logical test is associated with a value. If a windowed observation satisfies a test, the filter output is then associated with that value. Although the above architecture is not practical for filters requiring many tests, it does teach general representational method.

It is the aim of the present invention to overcome the conventional prior art print limitations, as described above, by programming a computational architecture to perform logical comparisons in a more compact and efficient way.

SUMMARY OF THE INVENTION

A method for implementing a filter on a signal is disclosed wherein interval membership information is computed and stored in such a manner so as to use a minimal amount of memory thereby allowing filter computation by a small number of deterministic sequence of table lookups and bit-wise logical operations. In general, the present invention involves using a non-linear filter represented as a plurality of intervals and the discrete values a sample may take. Each sample corresponds to a component in a vector. Each interval is comprised of a lower and upper vector. Each sample value is compared to the lower and upper values of the sample's associated coordinate. A table for that sample is then constructed with binary entries where a '1' denotes that a sample value is within the lower and upper values of the coordinate and '0' denoting otherwise. A table is built for each sample.

More specifically, the method of the present invention involves the steps of first obtaining a windowed observation from an image or signal and storing that observation in a vector X such that $X=(X_1, \ldots, X_N)$. Then, for each component $X_i$ stored in vector $(X_1, \ldots, X_N)$, obtaining an index into a table to produce a one-dimensional interval number $L_i(X_i)$. For each produced one-dimensional interval value $L_i(X_i)$, utilizing that number as an index into a table of bit-vectors to obtain the set of corresponding bit-vectors. Performing a logical AND operation for each set of N bit-vectors. Retrieving the position k of a unique non-zero bit and using position k as an index into a second table T of stored filter values. Retrieving the corresponding stored filter value such that T[k] is the filter value at observation X.

Additional benefits and advantages of the present invention will be set forth in the description which follows, and in part will be obvious from the description, or may be learned by the practice of this invention. The advantages of this invention, as described herein, may be realized and obtained by means particularly pointed out and distinctly claimed in the appended claims, taken in conjunction with the accompanying drawings and detailed specification.

BRIEF DESCRIPTION OF THE DRAWINGS

In order that the manner in which the above-recited and other advantages and objects of the present invention are obtained, a more particular description of this invention, briefly described above, will be rendered by reference to a specific embodiment thereof which is illustrated in the appended drawings. Understanding that these drawings depict only a typical embodiment of the present invention and are not therefore to be considered in any way limiting of its scope, this invention will be described and explained with additional specificity and detail through the use of the accompanying drawings, in which.

DETAILED DESCRIPTION OF THE INVENTION

Figure 1:
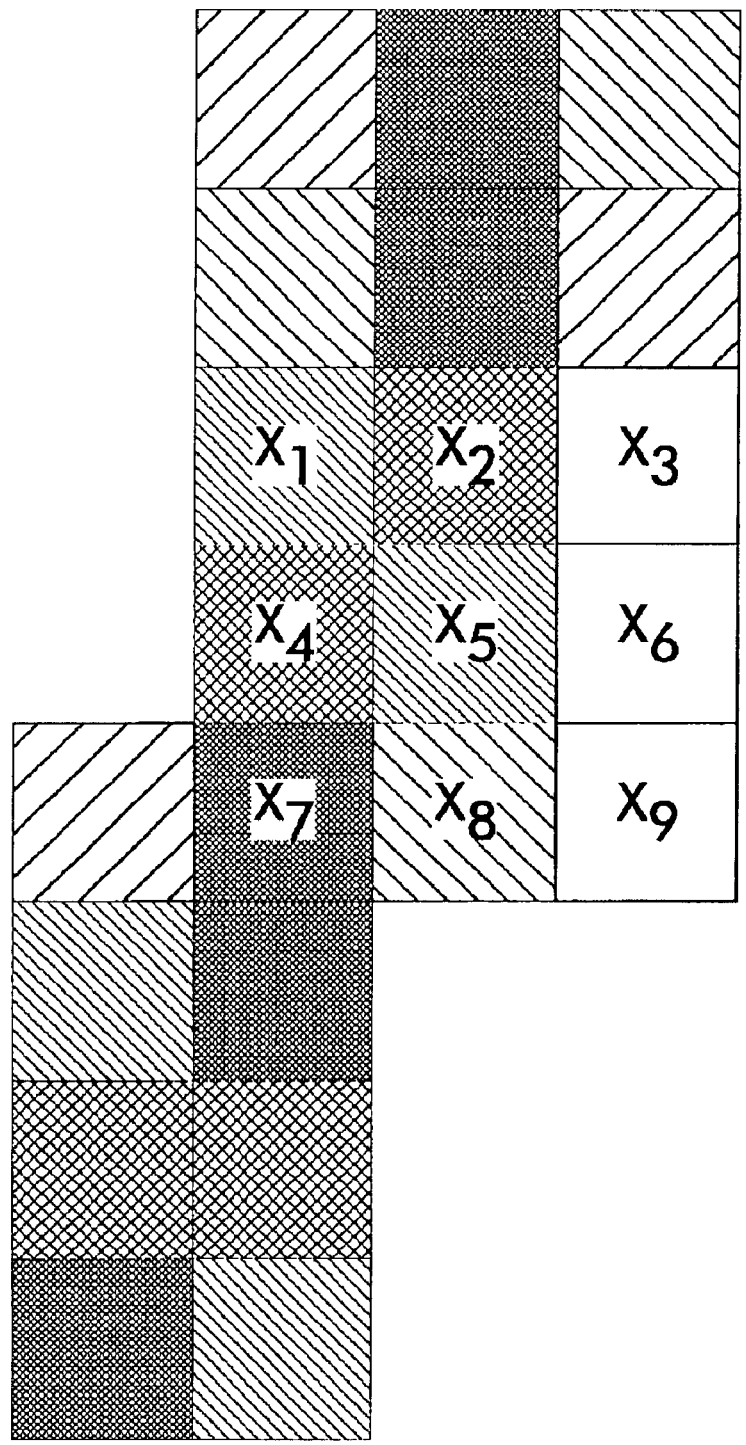
FIG. 1 is an illustration of a segment of a window capture wherein each pixel or sample is represented by vector notation based on a windowed observation ($x_1, x_2, x_3, x_4, x_5, x_6, x_7, x_8, x_9$) to modify or tag a center pixel.

What is presented is method for implementing a minimal architecture for computing a non-linear filter that performs a set of logical comparisons in a more compact and efficient manner so as to reduce computational time and system memory requirements.

At the onset, it should be understood that one skilled in this art should have a solid background in higher mathematics specifically in the fields of nonlinear signal or image processing, and be readily familiar with the concepts of binary operations, basic filtering concepts and operations, and preferably computer architecture.

A filter, whether operating on binary, gray-scale or other multilevel signals, can be represented mathematically by a set of interval memberships as taught in: *Computational Gray-Scale Morphology on Lattices (A Comparator-Based Image Algebra) Part I: Architecture*, E. R. Dougherty and D. Sinha, Real Time Imaging, Vol. 1, No. 1, 1995, incorporated herein by reference. To briefly explain, a filter can be represented mathematically as a function which maps a vector X to an output value a. Let us call S[a] the set of all vectors X which map to output value a. Each output value a of the filter thus has a set S[a] of all mapping vectors X. As a result, every possible signal sample from X belongs to S[a] for some a. If X belongs to S[b], for example, then the filter value at X is b. Now, each set S[a] can be further partitioned into a set of intervals [A,B] where interval A is less than or equal to interval B. Evaluating the filter is equivalent to determining to which interval among a plurality of intervals observation X belongs, and then given that interval, finding which set S[a] the interval belongs. Thus the problem in the arts to which the present invention is directed is the step of finding which interval a signal observation X belongs among a plurality of intervals. This can be a rather difficult problem because, in part, each interval either must be tested in turn thereby requiring much computational time or the entire set of intervals must be tested in parallel thereby requiring much computer memory. The step of finding the S[a] the set of all vectors X which map to output value a given an interval thereafter comprises a table lookup.

A method for implementing a filter on a signal is disclosed wherein interval membership information is computed and stored in such a manner so as to use a minimal amount of memory thereby allowing filter computation by a small number of deterministic sequence of table lookups and bit-wise logical operations. In general, the present invention involves using a non-linear filter represented as a plurality of intervals and the discrete values a sample may take. Each sample corresponds to a component in a vector. Each interval is comprised of a lower and upper vector. Each sample value is compared to the lower and upper values of the interval's associated coordinate. A table for that sample is then constructed with binary entries where a '1' denotes that a sample value is within the lower and upper values of the coordinate and '0' denoting otherwise. A table is built for each sample.

The method of the present invention involves the steps of first obtaining a windowed observation from an image or signal and storing that observation in a vector X such that $X=(X_1, \ldots, X_N)$. Then, for each component $X_i$ stored in vector $(X_1, \ldots, X_N)$, obtaining an index into a table to produce a one-dimensional interval number $L_i(X_i)$. For each produced one-dimensional interval value $L_i(X_i)$, utilizing that number as an index into a table of bit-vectors to obtain the set of corresponding bit-vectors. Performing a logical AND operation for each set of N bit-vectors. Retrieving the position k of a unique non-zero bit and using position k as an index into a second table T of stored filter values. Retrieving the corresponding stored filter value such that T[k] is the filter value at observation X.

Attention is directed to FIG. 1 which illustrates a windowed observation of a captured gray-scale image wherein nine samples or pixels represented by vector notation. From these nine samples of captured pixels, a filter is employed to make one or more decisions (or observations) with respect to the entire captured gray scale image. In signal or image processing, a filter operates on a sampled signal or image. In gray-scale image processing, each sample typically is sampled into one of 256 values represented as an eight-bit value. A filter operates on a plurality of simultaneous samples. Typically, non-linear filters are represented as a sequence of logical tests as to whether or not a windowed observation of a signal or captured image falls between two distinct values.

Figure 2:
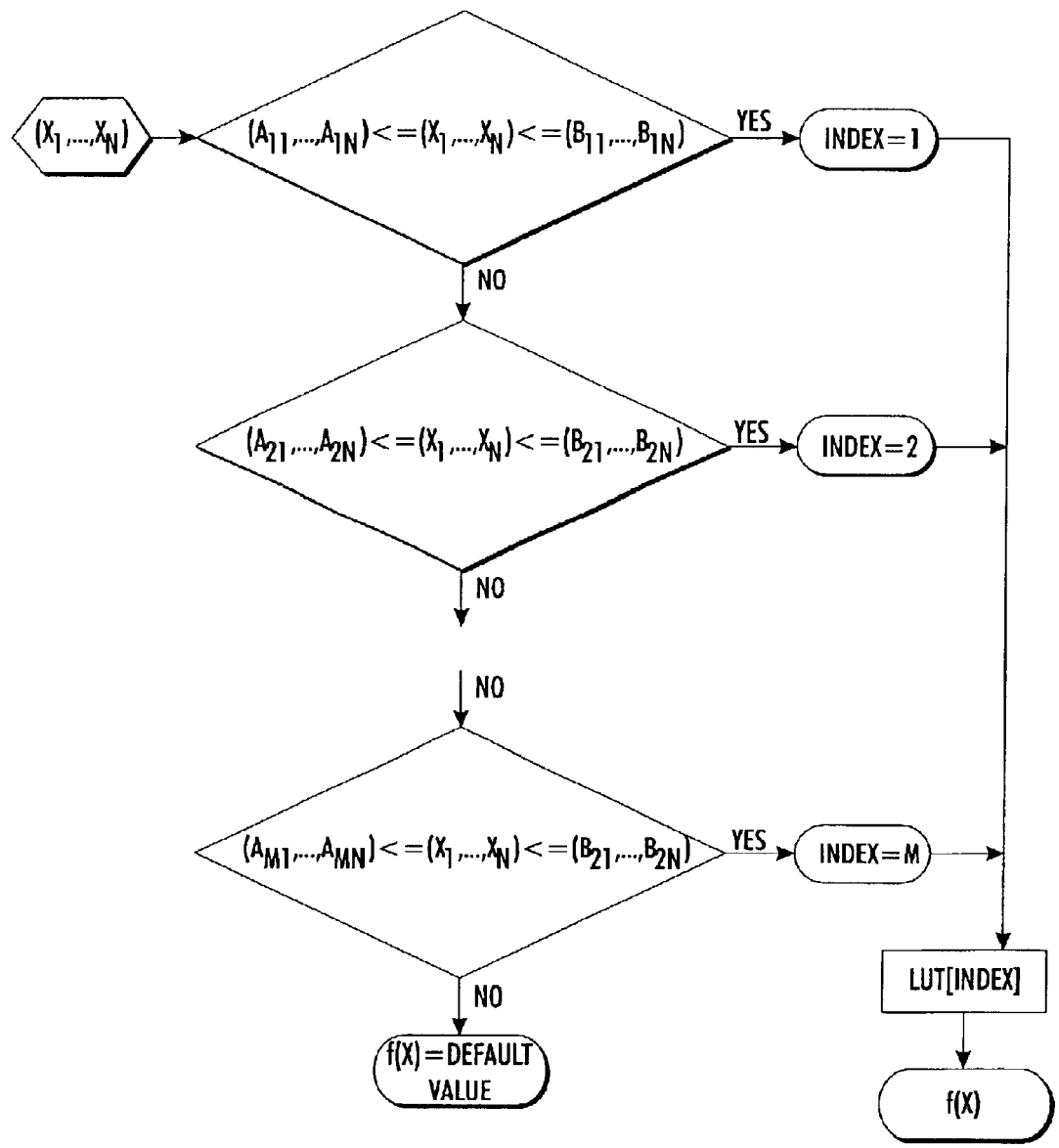
FIG. 2 illustrates a filter represented a sequence of logical tests followed by a table lookup.

Given an observation with Nsamples, as represented by $X=(X_1, \ldots, X_N)$, and the desire to test whether X is between a lower and an upper value given by $A=(A_1, \ldots, A_N) \leq X \leq B=(B_1, \ldots, B_N)$, wherein component-wise: $A_i \leq X_i \leq B_i$ for each $i=1, \ldots, N$, a filter can be employed to represent a list of the upper and lower pairs [A, B] and each interval has its associated output value. Once it is determined to which interval an observation belongs, the output value of the filter can be determined from this interval. With reference still being made to FIG. 1, a 3×3 sample is taken resulting in a vector of nine samples represented by $X=(X_1, \ldots, X_9)$. A filter maps this vector to one of a plurality of values. In general, the observation window can contain an arbitrary but finite number of observations although it need not be square nor contiguous. The general observation is denoted by $X=(X_1, \ldots, X_N)$ where N is unspecified. There are many operations contemplated in the art, including smoothing, restoration, quantization, among many others, for instance, a digital filter with a finite number of possible output values can be represented as a process whereby the sample X is compared to a plurality of intervals, or pairs of lower and upper vectors given by $[A_1, B_1], \ldots, [A_M, B_M]$. Each interval $[A_j, B_j]$ has an associated filter output value. The filter compares an observation X with each interval in a list until the first interval is found such that $A_j <= X <= B_j$. This may take as few as one comparison or as many as M comparisons. Once an interval is found, the value associated with it in the table is then returned as the value of the filter at X. This sequential evaluation process is illustrated in FIG. 2.

Figures 3, 4:
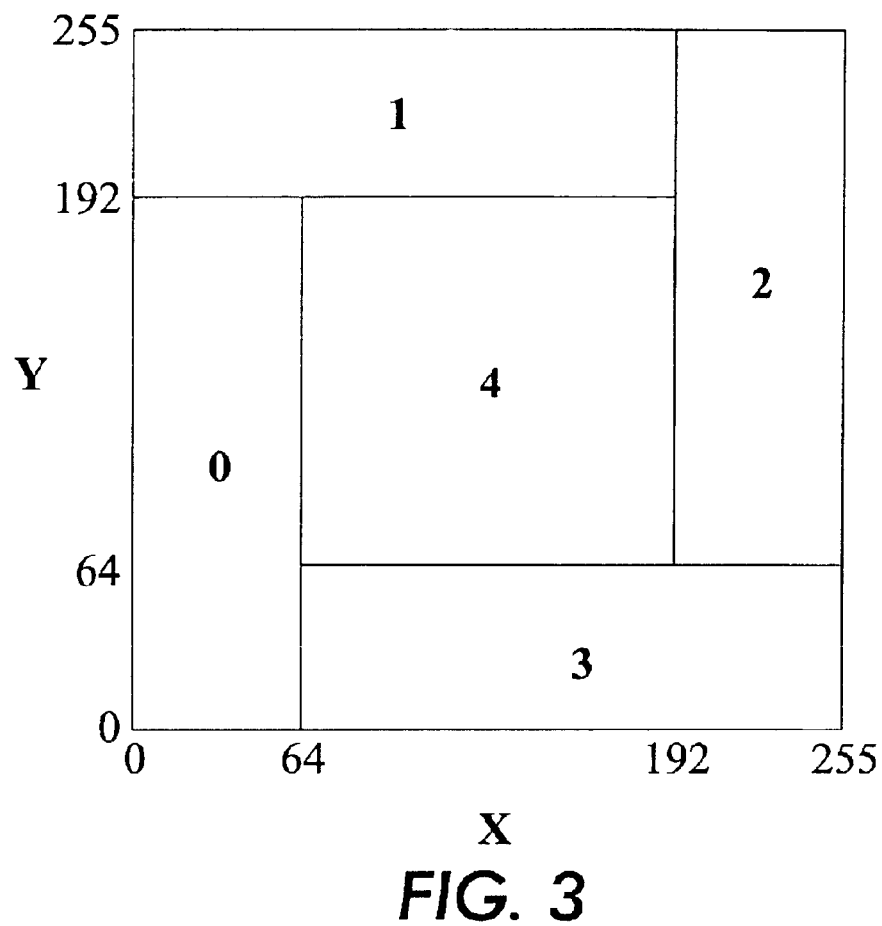
FIG. 3 illustrates a two-pixel filter represented geometrically as a partition of the set of all possible pixel-value pairs.
FIG. 4 illustrates the five intervals of the filter represented in FIG. 3.

FIG. 3 illustrates a simple example filter using only two observations X and Y. Any observation (x, y) falls into one and only one of five intervals as indicated. For example, (200, 100) falls into interval $L_2$. This interval has a filter value associated with it. Determining the filter value for each observation requires a non-deterministic number of steps and requires a significant amount of computation. The present invention produces a filter value in a fixed number of computational steps and also uses a minimal amount of computer memory.

FIG. 4 shows the coordinates of the five intervals that comprise the filter in FIG. 3 from which it can be observed that each two-dimensional interval can be projected onto the X and Y axes to produce three one-dimensional intervals on each respective axis. For example, interval $L_4$ produces interval [64,191] on the X axis. For each axis, label these one-dimensional intervals from 0 to the maximum number minus 1. For a given value of sample x, x fits into one of these intervals. Similarly, for a given value of y, y fits into one of the intervals of the Y axis.

Figures 5, 6:
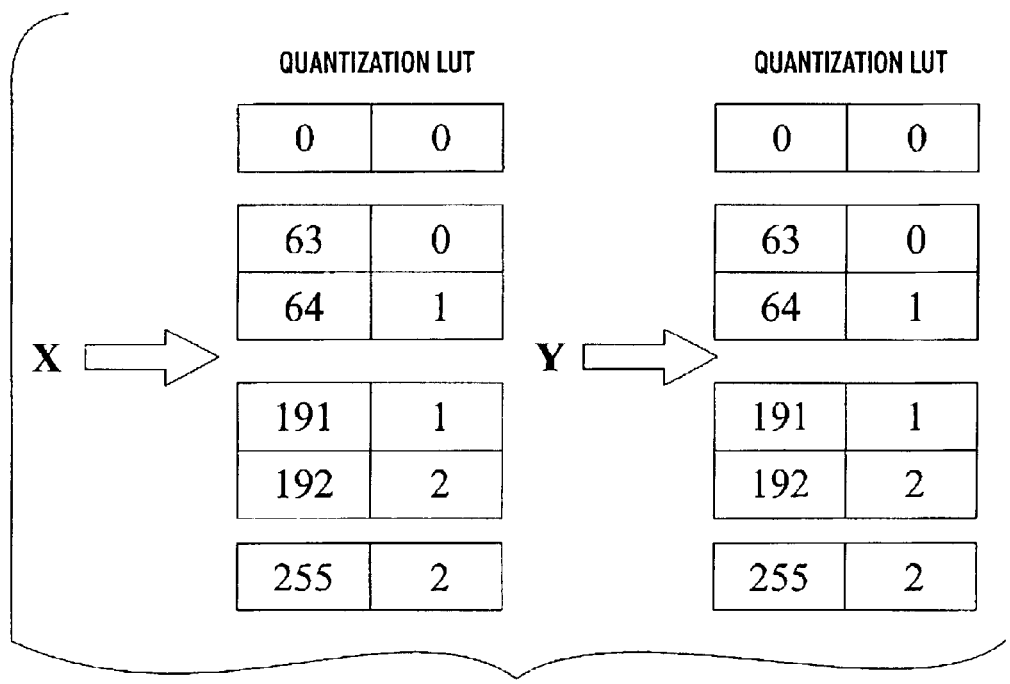
FIG. 5 illustrates the quantization step for the filter of FIG. 3.
FIG. 6 illustrates the minimal bit-vector storage for the filter of FIG. 3.

FIG. 5 shows a table for each axis and the one-dimensional interval labels for each sample value. For each axis, each one-dimensional interval corresponds to a number of two-dimensional intervals. For example, one-dimensional interval [64,191] on the x-axis corresponds to two-dimensional intervals $L_1$, $L_3$, and $L_4$ because points in these two-dimensional intervals project to points in the interval [64,191] on the x-axis.

FIG. 6 shows a table for each axis of the filter in FIG. 3. The column represents a label for the one-dimensional interval and the row entry represents labels of the two-dimensional intervals. A table has entry '1' in position (i,j) if one-dimensional interval i corresponds to two-dimensional interval j. For example, row three of the table for the x-axis is 0 1 0 1 1 which shows that one-dimensional interval 1 corresponds to two dimensional intervals 1, 3, 4. It is a consequence of this design that the rows or bit-vectors in each table are unique regardless of the number of axes, the possible samples per pixel (e.g., 8, 12, etc.), or N-dimensional intervals. Thus the tables require minimal storage.

Given an observation, for example (200, 100), each sample is indexed into the one-dimensional interval table corresponding to its axis. In this example, sample x=200 is indexed into the x-axis table in FIG. 5 to produce label 2 and sample y=100 is indexed into the y-axis table in FIG. 5 to produce label 1. X-axis label 2 is indexed into the x-axis bit-vector table to produce 0 0 1 1 0 and y-axis label 1 is indexed into the y-axis bit-vector table to produce 1 0 1 0 1. These two bit-vectors are logically AND'd together to produce 0 0 1 0 0. The bit position of the unique '1' is position 2 (counting from 0 from the left). This position is used to index a last table to produce the filter value for (200,100).

Figure 7:
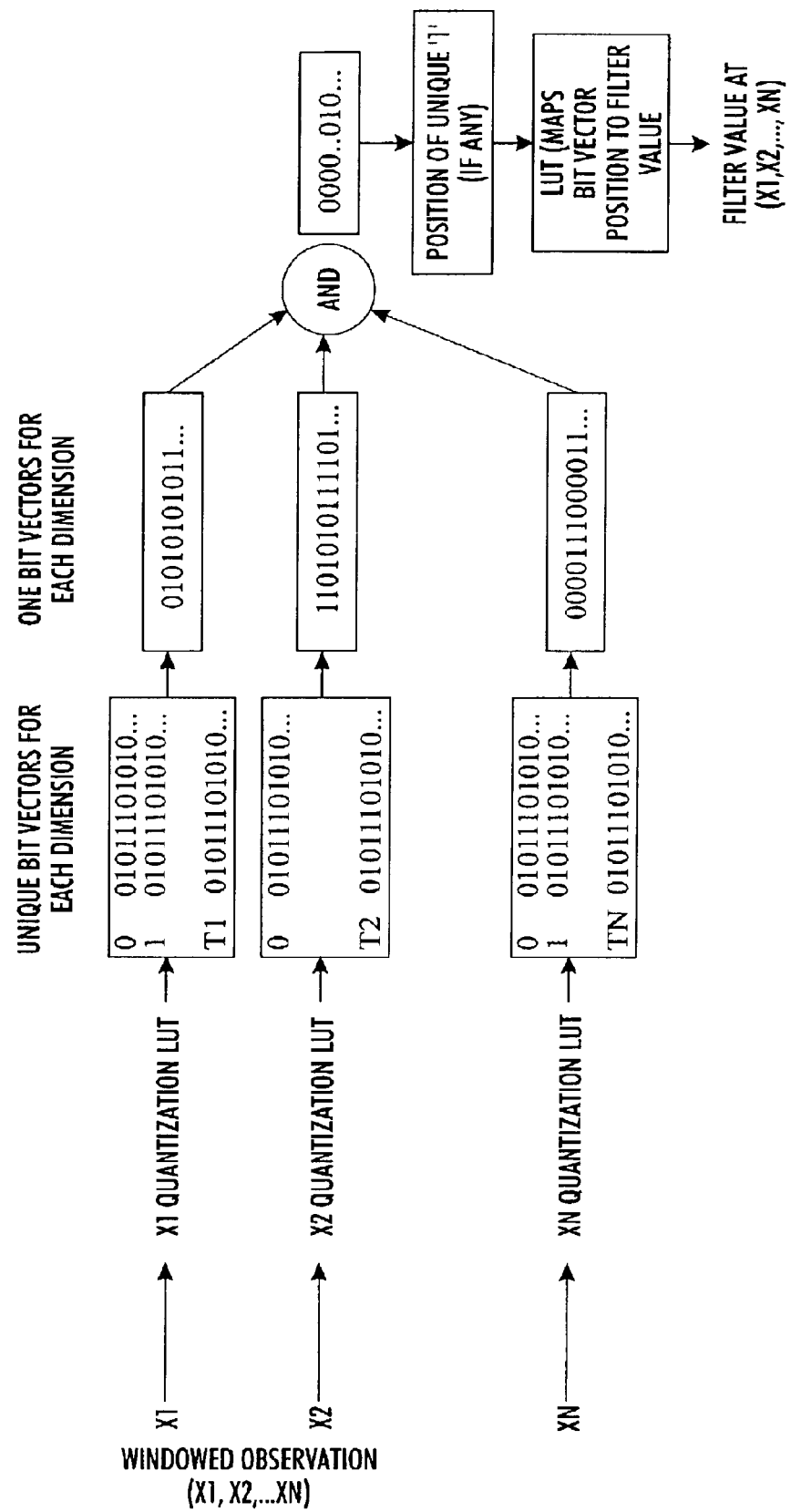
FIG. 7 illustrates the data flow and decision logic for a nonlinear filter in the accordance with the techniques of the present invention.

FIG. 7 illustrates the present invention in the general case where there are N-samples per observation.

In summary, a method for implementing a filter on a signal is disclosed wherein interval membership information is computed and stored in such a manner so as to use a minimal amount of memory thereby allowing filter computation by a small number of deterministic sequence of table lookups and bit-wise logical operations. In general, the present invention involves using a non-linear filter represented as a plurality of intervals and the discrete values a sample may take. Each sample corresponds to a component in a vector. Each interval is comprised of a lower and upper vector. Each sample value is compared to the lower and upper values of the sample's associated coordinate. A table for that sample is then constructed with binary entries where a '1' denotes that a sample value is within the lower and upper values of the coordinate and '0' denoting otherwise. A table is built for each sample.

Windowed shift-invariant filters represent a plethora of operations including but not limited to processing sampled digital electrical signals such as used in sensors, sound reproduction, servo-mechanical control, audio data compression, ultrasound, and so on. In two dimensions, windowed shift-invariant filters are used to process image data in medical imaging, remote sensing, machine vision and inspection, document processing, synthetic aperture radar, military target recognition, and so on. Examples are object detection, image enhancement, data compression, thresholding, noise-removal, image reconstruction, resolution conversion, segmentation, watermark insertion and detection, character recognition, and various data manipulations to prepare images for printing or display. Samples may also be obtained from higher-dimensional data such as voxels in a digital three dimensional representation of materials. Furthermore, the present invention will find its implementations in either hardware or computer software depending on the user's specific requirements. Windowed shift-invariant filters represent a plethora of operations including but not limited to processing sampled digital electrical signals such as used in sensors, sound reproduction, servo-mechanical control, audio data compression, ultrasound, and so on. In two dimensions, windowed shift-invariant filters are used to process image data in medical imaging, remote sensing, machine vision and inspection, document processing, synthetic aperture radar, military target recognition, and so on. Examples are object detection, image enhancement, data compression, thresholding, noise-removal, image reconstruction, resolution conversion, segmentation, watermark insertion and detection, character recognition, and various data manipulations to prepare images for printing or display. Samples may also be obtained from higher-dimensional data such as voxels in a digital three dimensional representation of materials. Further, images may have multiple channels, for example, color images may have three or four channels. Remotely sensed images may be hyper-spectral and have data in tens of spectral bands, for example, a hyper-spectral device may have a plurality of sensors, each sensitive to a specific interval of wavelengths such as long infrared, near infrared, visible, ultraviolet, etc. wherein each sensor may generate signals from electromagnetic radiation in its respective band of sensitivity. Windowed shift-invariant filters can be applied simultaneously on all image bands using the method of the present invention. For example, a filter may have some samples from a long-wave infrared band, some samples from a near infrared band, some from the visible portion of the light spectrum, and some samples from ultraviolet. When taken together, a windowed observation consists of samples separated in space or time as well as wavelength. In addition, the method of the present invention readily finds its implementations on sampled signal or image data whether the data are from spatially arranged sensors or from sensors tuned to different wavelengths or a combination thereof.

With the above-described detailed description of the preferred embodiment of the present invention and the above-described intended usages and envisioned variations thereto, one skilled in the art of computer architecture and programming and filter design and implementation will readily find their specific implementation in accordance herewith.

This invention may be embodied in other specific forms without departing from its spirit or essential characteristics. The above-described embodiments are to be considered in all respects only as illustrative and not restrictive in scope. The scope of the invention is, therefore, indicated by the appended claims rather than by the above-detailed description. Therefore, all changes which come within the meaning and range of equivalency of the claims are to be considered embraced within their scope.

What is desired to be secured by United States Letters Patent is:

1. A method for implementing a filter on a signal wherein interval membership information is computed and stored in such a manner that filter computation by a small number of deterministic sequence of table lookups and bit-wise logical operations can be performed quickly and efficiently, comprising the steps of:
   a) obtaining a windowed observation from an image or signal and storing that observation in a vector X such that $X=(X_1, \ldots, X_N)$;
   b) for each component $X_i$ stored in vector $(X_1, \ldots, X_N)$, obtaining an index into a table to produce a one-dimensional interval number $L_i(X_i)$;
   c) for each produced one-dimensional interval value $L_i(X_i)$, utilizing $L_i(X_i)$ as an index into a table of bit-vectors to obtain the set of corresponding bit-vectors;
   d) performing a logical AND operation for each set of N corresponding bit-vectors;
   e) retrieving position k of a unique non-zero bit and using position k as an index into a second table T of stored filter values; and
   f) de-referencing the corresponding stored filter value such that T is the filter value at observation X.

* * * * *